(12) United States Patent
McKenney

(10) Patent No.: US 10,452,638 B2
(45) Date of Patent: Oct. 22, 2019

(54) ATOMICALLY MOVING DATA ELEMENTS BETWEEN OR WITHIN LINKED DATA STRUCTURES HAVING NO SUPPORT FOR ATOMIC MOVES

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 15/379,133

(22) Filed: Dec. 14, 2016

(65) Prior Publication Data

US 2018/0165319 A1     Jun. 14, 2018

(51) Int. Cl.
*G06F 16/23*     (2019.01)
*G06F 9/50*     (2006.01)

(52) U.S. Cl.
CPC ........ *G06F 16/2343* (2019.01); *G06F 9/5016* (2013.01); *G06F 16/2365* (2019.01)

(58) Field of Classification Search
CPC ............. G06F 16/2365; G06F 16/1774; G06F 16/2336; G06F 16/9014; G06F 16/2343; G06F 9/50
USPC .......................................................... 707/703
See application file for complete search history.

(56) References Cited

U.S. PATENT DOCUMENTS

| | | |
|---|---|---|
| 7,685,583 B2 | 3/2010 | Moir et al. |
| 7,873,612 B2 | 1/2011 | McKenney et al. |
| 8,619,972 B2 | 12/2013 | Elmegaard-Fessel |
| 8,768,889 B1 | 7/2014 | Martin |
| 8,839,226 B2 | 9/2014 | Brannock et al. |
| 9,135,178 B2 | 9/2015 | Shavit et al. |
| 9,229,724 B2 | 1/2016 | Brooker et al. |
| 9,274,855 B2 | 3/2016 | Adl-Tabatabai et al. |
| 2004/0148463 A1* | 7/2004 | Brown ...................... G06F 9/52 711/118 |

(Continued)

OTHER PUBLICATIONS

McKenney, "High-Performance and Scalable Updates: The Issaquah Challenge", ACM Applicative Conference on, Jun. 1, 2016, pp. 1-86.

(Continued)

*Primary Examiner* — Robert W Beausoliel, Jr.
*Assistant Examiner* — Pedro J Santos
(74) *Attorney, Agent, or Firm* — Walter W. Duft

(57) ABSTRACT

A technique for atomically moving a linked data element may include providing an atomic-move wrapper around the data element, along with an existence header whose status may be permanent, outgoing or incoming to indicate whether the data element is not in transition, or if in transition is either outgoing or incoming. The existence header may reference an existence group having a state field that changes state using a single store operation. A first state may indicate that the data element exists if its existence header is outgoing, and does not exist if its existence header is incoming. A second state may indicate that the data element exists if its existence header is incoming, and does not exist if its existence header is outgoing. Following the state change, the existence group and any atomic-move wrapper containing an outgoing existence header and data element may be freed following an RCU grace period.

20 Claims, 12 Drawing Sheets

(56) References Cited

U.S. PATENT DOCUMENTS

| | | | |
|---|---|---|---|
| 2006/0112121 A1* | 5/2006 | McKenney | G06F 16/9024 |
| 2012/0303908 A1* | 11/2012 | Dantzig | G06F 12/084 |
| | | | 711/145 |
| 2012/0324473 A1* | 12/2012 | McKenney | G06F 9/526 |
| | | | 718/107 |
| 2014/0108365 A1* | 4/2014 | McKenney | G06F 9/4881 |
| | | | 707/695 |
| 2014/0181692 A1 | 6/2014 | Gupta | |
| 2015/0019792 A1 | 1/2015 | Swanson et al. | |
| 2015/0089156 A1 | 3/2015 | Clohset et al. | |
| 2015/0134602 A1 | 5/2015 | Nicholas et al. | |
| 2016/0224608 A1 | 8/2016 | McKenney | |

OTHER PUBLICATIONS

McKenney, "Non-Transactional Implementation of Atomic Tree Move", WG21/N4037, May 26, 2014, pp. 1-33.
Cederman et al; "Supporting Lock-Free Composition of Concurrent Data Objects: Moving Data Between Containers", IEEE Trans. on Comp., vol. 62, No. 9, Sep. 2013, pp. 1866-1878.
Anonymous, "Use of Transactional Memory for Linked Lists Without Locks", IPCOM000245536D, Mar. 15, 2016, pp. 1-6.

\* cited by examiner

ATOMICALLY MOVING DATA ELEMENTS BETWEEN OR WITHIN LINKED DATA STRUCTURES HAVING NO SUPPORT FOR ATOMIC MOVES

BACKGROUND

1. Field

The present disclosure relates to linked data structures. More particularly, the disclosure concerns moving elements between or within linked data structures concurrently with data read operations.

2. Description of the Prior Art

By way of background, linked data structures, such as hash tables, search trees, linked lists, etc., have been proposed that allow data updates to be performed concurrently with lockless data read-side operations. However, non-transactional-memory-based algorithms are lacking that can atomically move a data element from one linked data structure to another, or move a data element within a linked data structure, without delaying lockless readers, particularly when there is no support for atomic moves.

Commonly owned U.S. Published Patent Application No. 2016/0224608 describes how to combine locking, read-copy update (hereinafter referred to as RCU), and existence structures (also called allegiance structures) to implement atomic moves in RCU-protected linked data structures. This works correctly, and performs and scales reasonably well, but requires a separate implementation of the RCU-protected linked data structure. The changes required are minor, but the fact that any changes are required at all makes this approach more difficult to apply, and more costly to maintain the result.

What is needed is a way to obtain atomic move functionality based on pre-existing implementations of RCU-protected data structures.

SUMMARY

A method, system and computer program product are provided for atomically moving a data element between or within linked data structures protected by read-copy update (RCU) and having no support for atomic moves. In an example embodiment, an atomic-move wrapper may be provided around the data element. The atomic-move wrapper may include an existence header having a status field that indicates whether the existence header is a permanent existence header for a data element that is not undergoing an atomic-move operation, whether the existence header is an outgoing existence header for a data element that is to undergo an atomic-move operation which removes the data element from an RCU-protected linked data structure, or whether the existence header is an incoming existence header for a data element that is to undergo an atomic-move operation which adds the data element to an RCU-protected linked data structure. The existence header may maintain a reference to an existence group having an existence group state field that can be switched between a first state and a second state. The first state may indicate that the data element is deemed to exist if it has an outgoing existence header and to not exist if it has an incoming existence header. The second state may indicate that the data element is deemed to exist if it has an incoming existence header and to not exist if it has an outgoing existence header. If the data element is to be added to an RCU-protected linked data structure, its existence header may be designated as incoming and the data element may be added to the linked data structure. If the data element is to be is to be removed from an RCU-protected linked data structure, its existence header may be designated as outgoing. The state of the existence group state field may be changed from the first state to the second state using a single store operation to indicate existence for the data element if it has an incoming existence header and non-existence for the data element if it has an outgoing existence header. If the data element has an incoming existence header, the existence header's status field may be updated to indicate that the existence header is a permanent existence header. If the data element has an outgoing existence header, the data element may be removed from an RCU-protected linked data structure. The existence group may be caused to be freed following an RCU grace period, as well as the atomic-move wrapper and its contents if the atomic wrapper contains a removed data element having an outgoing existence header.

BRIEF DESCRIPTION OF THE DRAWINGS

The foregoing and other features and advantages will be apparent from the following more particular description of example embodiments, as illustrated in the accompanying Drawings.

DETAILED DESCRIPTION OF EXAMPLE EMBODIMENTS

Example embodiments will now be described for atomically moving data elements between or within linked data structures, such as hash tables, search trees, linked lists, etc., without delaying lockless readers. In accordance with the present disclosure, the disclosed atomic-move functionality may utilize an atomic-move wrapper (container) around each data elements of an RCU-protected data structure. The atomic-move wrappers make use of references to a single-word existence-group-state field, allowing the state of the references to all be simultaneously updated with a single store to that field.

Figure 1:
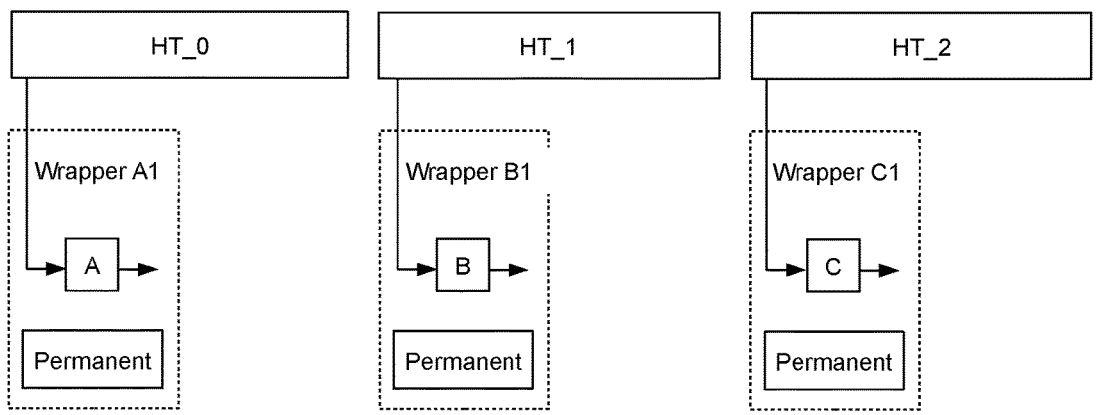
FIG. 1 is a functional block diagram showing three example hash table data elements associated with three respective hash tables, each data element being contained within an atomic-move wrapper that also includes an existence header.

In an embodiment, a prior art low-order-pointer-bit approach is used to reference the existence-group-state field. If the low-order bit matches the referenced existence-group-state field, the RCU-protected data structure exists, otherwise it does not. FIGS. 1-4 are illustrative. These Figures depict how data structures that implement an embodiment of the above-mentioned atomic-move wrappers, together with another data structure that implements an embodiment of the above-mentioned existence-group, may be used to atomically rotate three data elements ("A", "B", and "C") though three hash tables ("HT_0," "HT_1," and "HT_2). The hash tables HT_0, HT_1 and HT_2 are all read copy update (RCU)-protected linked data structures. The arrows going to and from the data elements A, B, and C signify pointers from and to other hash table structures. Initially, as shown in FIG. 1, data element A is a member of hash table HT_0, data element B is a member of hash table HT_1, and data element C is a member of hash table HT_2. Each of data elements A, B, and C is contained within its own atomic-move wrapper, respectively named, "Wrapper A1", "Wrapper A2" and "Wrapper A3". Each atomic-move wrapper contains a data structure referred to herein as an "existence header." In FIG. 1, the existence headers are labeled "Permanent" to indicate that there is no atomic-move operation underway involving the associated data element. The data element is perceived to exist and to not be in transition.

Figure 2:
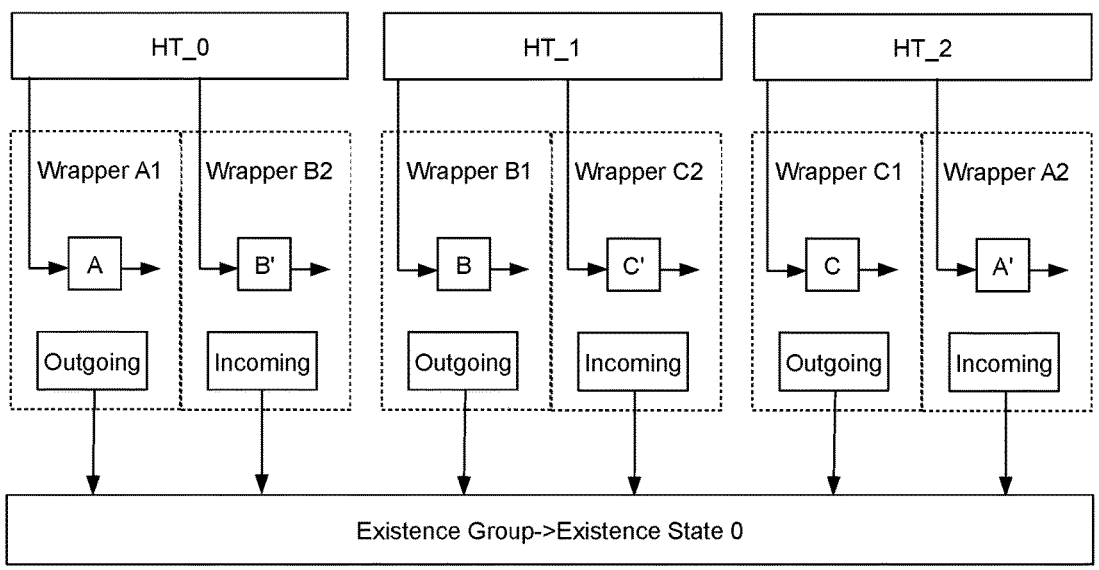
FIG. 2 is a functional block diagram showing the three example hash table elements during a first stage of an atomic-move operation that will rotate the data elements to different ones of the three hash tables using an existence group, the existence group having an existence state field set to a first state.

FIG. 2 illustrates a first stage of an atomic update operation that will move data element A to hash table HT_2, data element B to hash table HT_0, and data element C to hash table HT_1. The existence headers in each of Wrapper A1, Wrapper B1, and Wrapper C1 have been updated from "Permanent" to "Outgoing." This indicates (to hash table readers) that data elements A, B, and C are undergoing an atomic-move operation and are outgoing from their respective hash tables HT_0, HT_1, and HT_2. FIG. 2 also illustrates that three additional atomic-move wrappers, respectively named "Wrapper A2," "Wrapper B2," and "Wrapper C2," have been allocated. Wrapper A2 contains a data element A' (a copy of data element A) that will become a member of hash table HT 2. Wrapper B2 contains a data element B' (a copy of data element B) that will become a member of hash table HT 0. Wrapper C2 contains a data element C' (a copy of data element C) that will become a member of hash table HT_1. The new atomic-move wrappers contain existence headers that are initially marked as "Incoming." This designation indicates (to hash table readers) that the data elements A', B' and C' are undergoing an atomic move operation and are incoming to their respective hash tables HT_2, HT_0, and HT_1. As additionally shown in FIG. 2, an existence-group structure containing an existence-state field has been allocated and linked to by all six existence headers. The initial value of the existence-state field is zero, indicating (to hash table readers) that the data elements associated with the outgoing existence headers are perceived to still exist and the data elements associated with the incoming existence headers are perceived to not yet exist.

Note that the change in state between FIGS. 1 and 2 may be carried out incrementally because there is no change in perceived state. However, this may result in an increase in the amount of computation required to determine the state.

Figure 3:
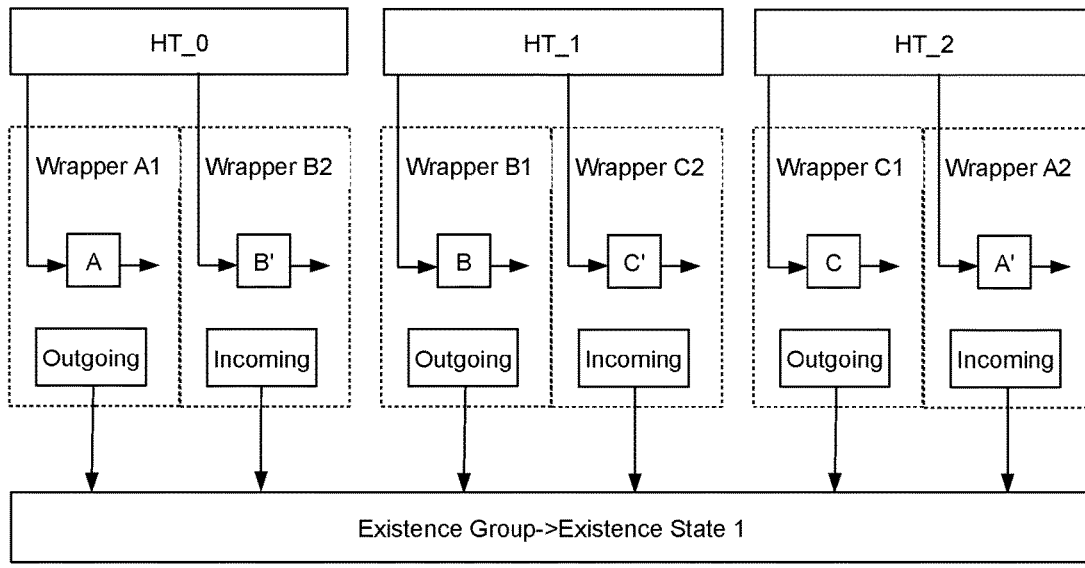
FIG. 3 is a functional block diagram showing the three example hash table elements during a second stage of an atomic-move operation that will rotate the data elements to different ones of the three hash tables, the existence group having an existence state field set to a second state.
Figure 4:
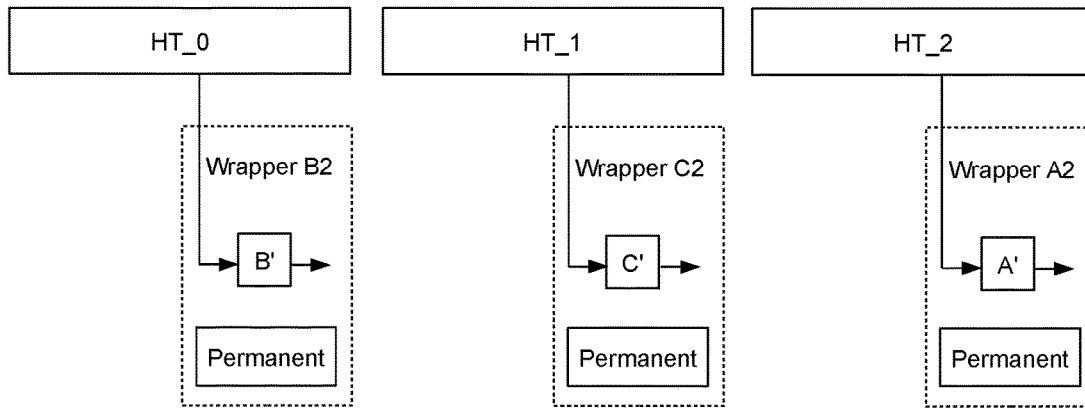
FIG. 4 is a functional block diagram showing the three example hash table elements following an atomic move operation that rotates the data elements to different ones of the three hash tables.

FIG. 3 illustrates a second stage of the atomic-move operation after the existence-switch field has been changed from zero to one. This change is atomic in a weak sense in that reads running concurrently with this change will either see the initial value of zero or the final value of one, not some arbitrary transient value. The data elements associated with the outgoing existence headers will now be perceived to no longer exist, and the data elements associated with the incoming existence headers will be perceived to exist. As a result, data element "A" will have moved from "HT_0" to "HT_2," data element "B" from "HT_1" to "HT_0," and data element "C" from "HT_2" to "HT_1", all in a single atomic operation.

Original data elements A, B, and C may now be incrementally unlinked from the hash tables and freed following an RCU grace period. Their associated outgoing existence headers, as well as the existence group, may also be freed following an RCU grace period. This results in the state shown in FIG. 4. In this way, data elements that are members of an RCU-protected linked data structure may be wrappered with existence headers that reference an existence-group containing an existence-state field in order to carry out complex atomic operations, with only simple insertion and removal operations being needed for the data elements themselves.

Figure 5:
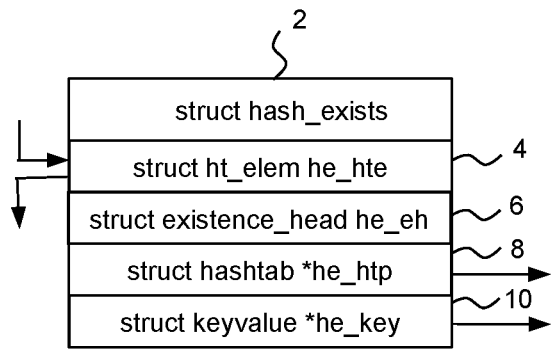
FIG. 5 is a functional block diagram showing an example embodiment of an atomic-move wrapper as depicted in FIGS. 1-4.

Turning now to FIG. 5, an example data structure 2 that may be used as an atomic-move wrapper for use with hash tables is shown. The atomic-move wrapper 2 bears the arbitrary name "hash_exists," and will be referred to hereinafter as the hash_exists atomic-move wrapper 2. The hash_exists atomic-move wrapper 2 aggregates an underlying hash table data element 4 (with data type "struct ht_elem") with an existence header 6 (with data type "struct existence_head"). The field containing the data element 4 may be called "→he_hte." The field containing the existence header 6 may be called "→he_eh." The hash_exists atomic-move wrapper 2 may further include an "→he_htp" field 8 and "an →he_key" field 10. The →he_htp field 8 contains a pointer (with data type "struct hashtab") that references the enclosing hash table in order to enable easy insertion and deletion. The →he_key field 10 contains a pointer (with data type "struct keyvalue") that references the data to be included in the hash table. This data could also be included into the hash_exists atomic-move wrapper 2 itself, so that the data is copied on each move. This copying approach may serve as an alternative embodiment in cases where the data is small and where it is not necessary to maintain long-lived external references to that data.

Figure 6:
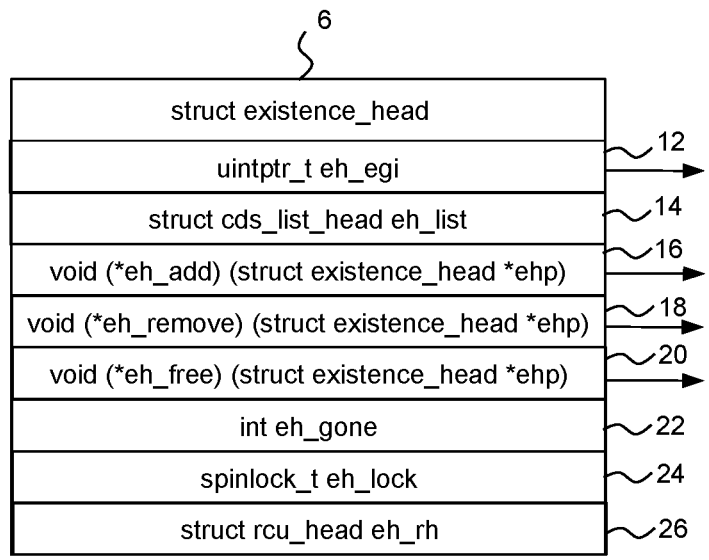
FIG. 6 is a functional block diagram showing an example embodiment of an existence header as depicted in FIGS. 1-4.

Turning now to FIG. 6, an example existence_head data structure is shown that may be used for the he_eh existence header 6 of FIG. 5. The field 12 named "→eh_egi" contains an unsigned integer pointer (with data type "uintptr_t"). As described in more detail below, the eh_egi pointer is used as an existence-group index. The pointer value will be zero (aka NULL) if the enclosed he_hte data element 4 is permanent and not in transition, will reference the corresponding existence_group structure's →eg_state field (see discussion of FIG. 7 below) if the data element is outgoing, or be one greater than a reference to that same field if the data element is incoming. The field 14 named "→eh_list" is a pointer (with data type "struct cds_list_head") that allows the he_eh existence header 6 to be linked into lists that group structures by the cleanup processing required after a successful atomic move on one hand, or upon backout on the other hand. These operations are described in more detail below. Fields 16, 18 and 20 contain function pointers to functions that are respectively named "→eh_add( )," "→eh_remove( )," and "→eh_free( )." These functions take he_eh existence headers 6 as parameters. The functions allow the hash_exists atomic-move wrapper 2 to perform the corresponding operations on the underlying he_hte data element 4. They may be implemented for each he_eh existence header 6 that is to take part in atomic-move operations. Examples are respectively discussed below in connection with FIG. 14 (add), FIG. 15 (remove) and FIG. 16 (free). The field 22 named "→eh_gone" (with data type "int") is used to indicate that the existence header 6 has been deleted. The field 24 name "→eh_lock" (with data type "spinlock_t") synchronizes concurrent attempts to involve the existence header 6 in an atomic-move operation. The field 26 named "→eh_rh" (with data type "struct rcu_head data") allows the he_eh existence header 6 to be passed to the call_rcu( ) primitive for RCU grace-period processing.

To initialize the he_eh existence header 6, the →eh_egi field 12 may be set to 0 (a.k.a. NULL). This will indicate a default state of the he_eh existence header 6 as "Permanent." As previously noted, the "Permanent" existence header designation means the associated data element is not undergoing an atomic-move operation. It is perceived to exist and to not be in transition. The remaining fields 14-26 of the he_eh existence header 6 are also initialized. For the →eh_add( ), →eh_remove( ) and →eh_free( ) function pointer fields 16, 18 and 20, initialization defines how to add, remove and free the ht_hte data element 4. For the →eh_gone field 22, initialization marks the existence header 6 as not yet deleted.

Figure 7:
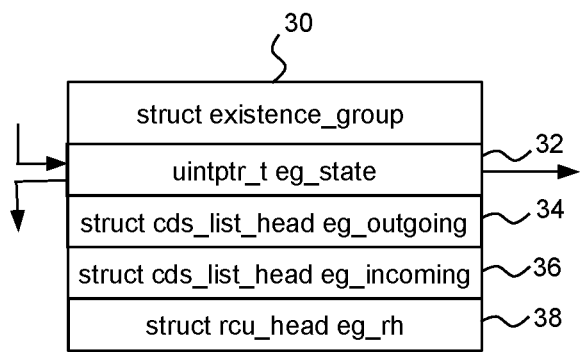
FIG. 7 is a functional block diagram showing an example embodiment of an existence group as depicted in FIGS. 2-3.

Turning now to FIG. 7, an example data structure 30 named "existence_group" that may be used as an existence group for use with hash tables is shown. As previously discussed, the existence group 30 is so named because it can mediate an atomic operation involving an arbitrarily large group of data elements. The field 32 named "→eg_state" contains an unsigned integer pointer value (with data type "uintptr_t"). The →eg_state field initially contains zero to indicate that the outgoing structures still exist but that the incoming structures do not yet exist. The field may be changed (as discussed in more detail below below) to the value one to atomically reverse this situation, so that the outgoing structures no longer exist, but the incoming structures now do exist. The field 34 named "→eg_outgoing" (with data type "struct cds_list_head") is a linked list of the outgoing existence headers 6. The field 36 named "→eg_incoming field" (with data type "struct cds_list_head") is a linked list of incoming existence headers 6. These two lists facilitate clean up after a successful atomic operation (as described in more detail below). They also facilitate a back out from an unsuccessful atomic operation (as described in more detail below). The field 38 named "→eh_rh" (with data type "struct rcu_head") allows the existence group 30 to be passed to the RCU call_rcu( ) primitive for grace-period processing.

To initialize the existence group 30, the →eg_state field 32 may be set to zero so that he_hte data elements 4 having outgoing he_eh existence headers 6 will be perceived as existing and he_hte data elements having incoming he_eh existence headers will be perceived as not existing. The →eg_outgoing list 34 and the →eg_incoming list 36 may be initialized to empty.

Figure 8:
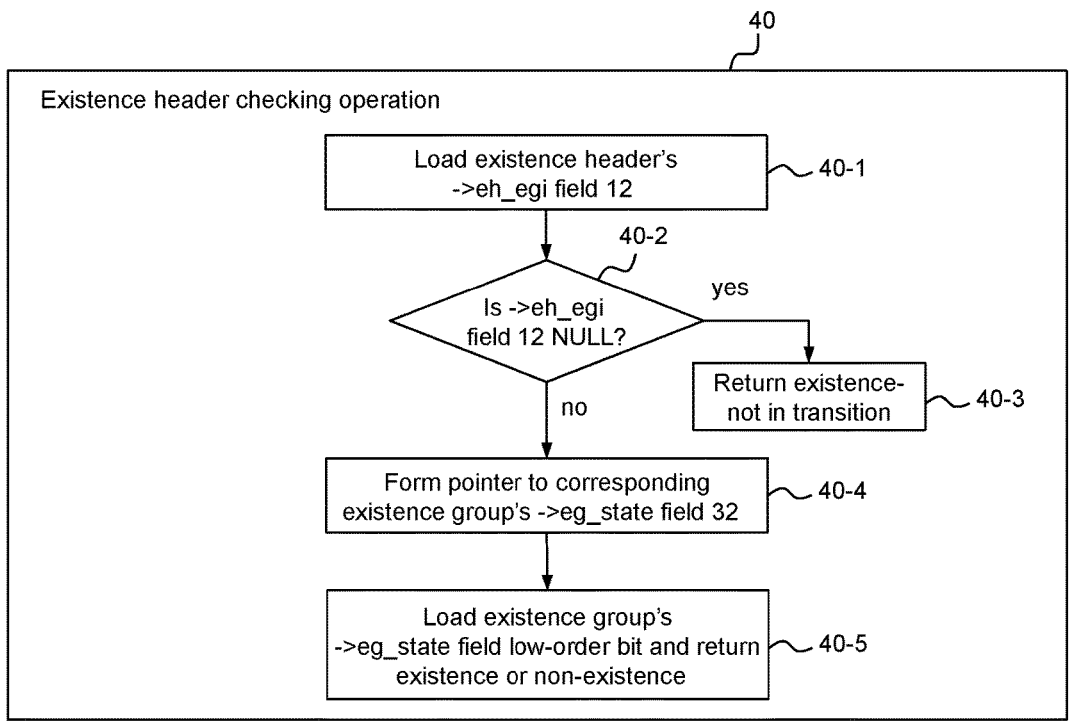
FIG. 8 is a flow diagram showing an example existence header checking operation.

Turning now to FIG. 8, an example existence checking operation 40 is shown that may be used by hash table readers to determine whether a particular he_hte data element 4 within a hash_exists atomic-move wrapper 2 should be perceived to exist. Block 40-1 loads the →eh_egi field 12 of the hash_exists atomic-move wrapper's he_eh existence header 6. An smp_load_acquire( ) function or the like may be used to provide acquire memory ordering semantics. Alternatively, a more relaxed memory ordering load, such as ACCESS_ONCE( ), may be used. Block 40-2 checks whether the existence header's →eh_egi field 12 is NULL (e.g., 0). If desired, this check may be performed using an "if likely( )" compiler optimization to indicate that NULL is the expected value of the →eh_egi field 12. This approach recognizes that the →eh_egi field 12 will only have a non-NULL value during data element update operations. Insofar as the associated data element is a member of an RCU-protected linked data structure, it is assumed that updates will occur infrequently relative to read operations. If block 40-2 determines that the eh_egi field 12 is NULL, block 40-3 returns a value indicating that the associated data element exists and is not in transition. If block 40-2 determines that the eh_egi field 12 is non-NULL, block 40-4 forms a pointer to the corresponding existence group's →eg_state field 32. Block 40-5 loads the →eg_state field 32 (e.g., using an smp_load_acquire( ) or ACCESS_ONCE( ) operation) and returns an indication of whether or not the low-order bit matches the low order bit of the he_eh existence header's →eh_egi field 12. If it does, existence is indicated. Otherwise, non-existence is indicated.

Figure 9:
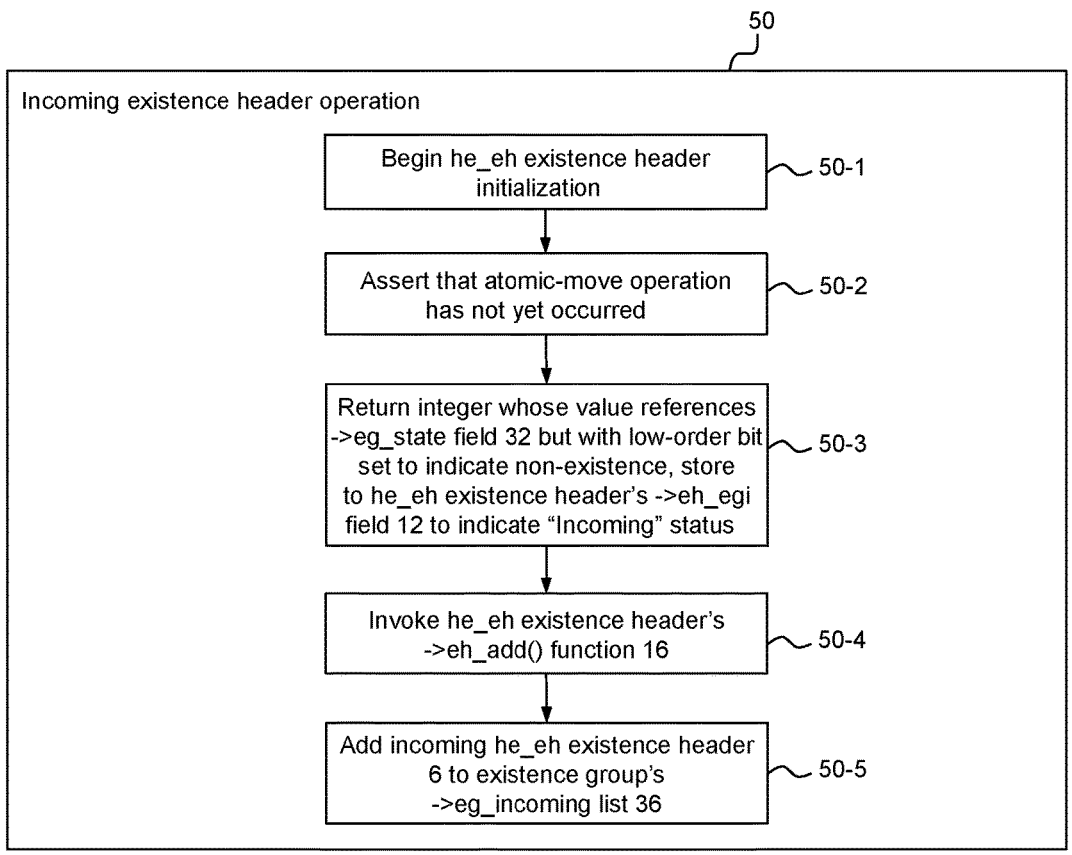
FIG. 9 is a flow diagram showing an example incoming existence header operation.

Turning now to FIG. 9, an example incoming existence header operation 50 is shown that may be used by hash table updaters. This operation is used when the updater creates a new he_hte data element 4 (with its own hash_exists atomic-move wrapper 2) in preparation for an atomic-move operation. The purpose of the incoming existence header operation 50 is to create a new he_eh existence header 6 with the →eh_egi field 12 set to "Incoming." This operation may also add the associated he_hte data element 4 to the target RCU-protected linked data structure. Block 50-1 begins the initialization process. Block 50-2 asserts that an atomic-move operation has not yet occurred. In an embodiment, this operation may be performed using a C-language command such as BUG_ON(ACCESS_ONCE((egp→eg_state)), which performs a relaxed memory ordering load of the →eg_state field 32 of the existence group 30 and uses the Linux® BUG_ON( ) macro to verify the state. Block 50-3 returns an integer (e.g., a unintptr_t integer pointer) whose value references the existence group's →eg_state field 32, but with the low order bit being set (e.g., to 1) to indicate non-existence. Block 50-3 then stores the integer to the →eh_egi field 12 of the new he_eh existence header 6 so as to indicate "Incoming" status. The remaining fields of the he_eh existence header 6 are also initialized. Block 50-4 call the he_eh existence header's eh_add( ) function, if one exists, to add the associated he_hte data element 4 to the target RCU-protected linked data structure. If this succeeds, block 50-5 adds the incoming he_eh existence header 6 to the →eg_incoming list 36 of the existence group 30.

Figure 10:
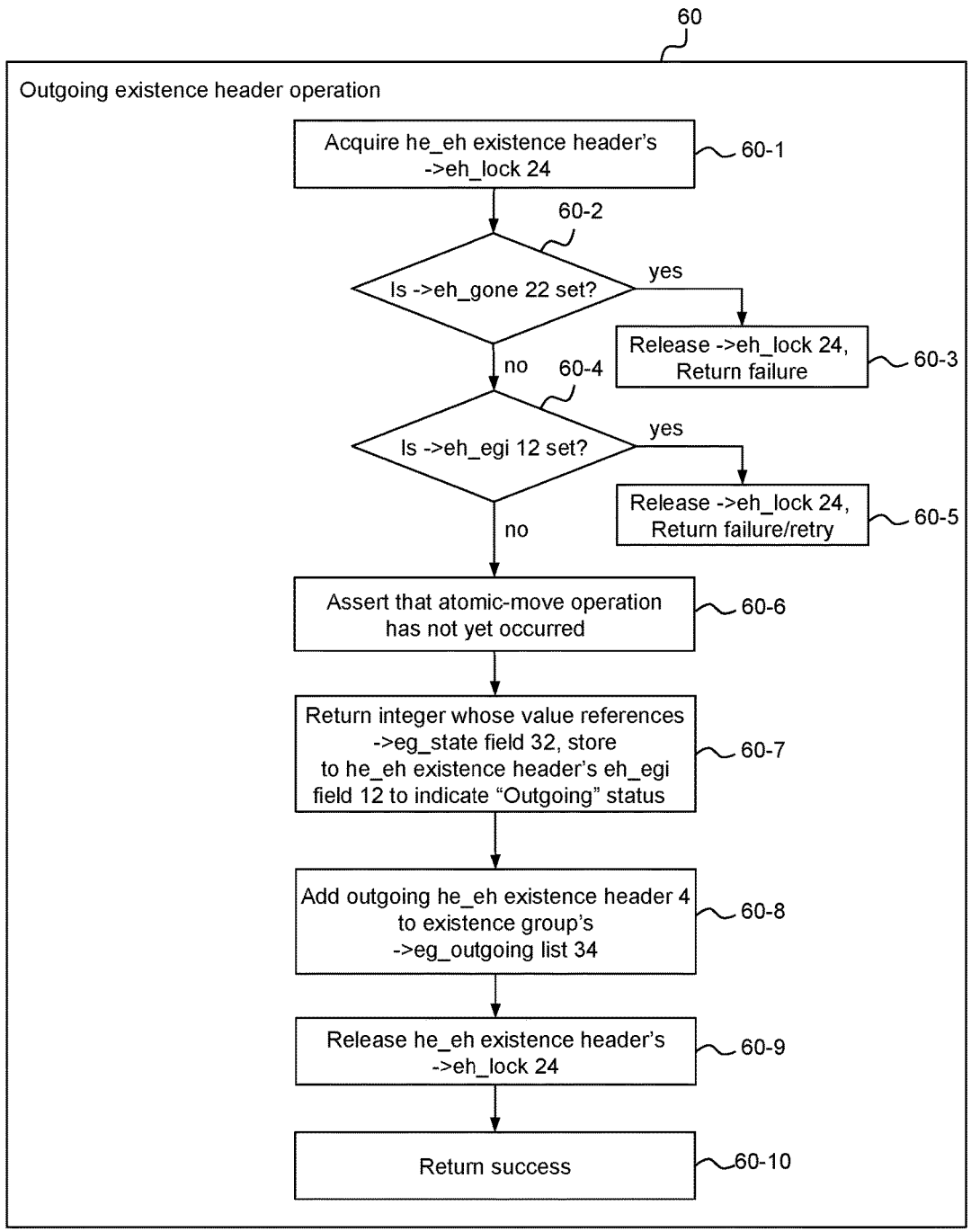
FIG. 10 is a flow diagram showing an example outgoing existence header operation.

Turning now to FIG. 10, an example outgoing existence header operation 60 that may be performed by a hash table updater is shown. This operation is used when the updater needs to change the status of an he_eh existence header 6 for an existing he_hte data element 4 that will be removed from an RCU-protected linked data structure as part of an atomic-move operation. The purpose of the outgoing existence header operation 60 is to update the he_eh existence header 6 from "Permanent" to "Outgoing" status. Block 60-1 acquire the he_eh existence header's →eh_lock 24. Block 60-2 checks the he_eh existence header's →eh_gone field 22 to determine whether the he_eh existence header 6 has already been deleted. If so, block 60-3 releases the →eh_lock 24 and returns a failure indication to the caller. Otherwise, block 60-4 checks whether the he_eh existence header 6 is already part of an atomic-move operation. If so, block 60-5 releases the →eh_lock 24 and returns a failure/retry indication to the caller. Otherwise, block 60-6 asserts that an atomic-move operation has not yet occurred. In an embodiment, this operation may be performed using a C-language command such as BUG_ON(ACCESS_ONCE ((egp→eg_state)), which performs a relaxed memory ordering load of the →eg_state field 32 of the existence group 30 and uses the Linux® BUG_ON( ) macro to verify the state. Block 60-7 returns an integer (e.g., a unintptr_t integer pointer) whose value references the existence group's →eg_state field 32, and whose low order bit will indicate existence (e.g., 0). Block 60-7 then stores the integer to the →eh_egi field 12 of the he_eh existence header 6 so as to indicate "Outgoing" status. An smp_store_release( ) function may be used for this operation to provide release memory ordering semantics. Block 60-8 adds the outgoing he_eh existence header 6 to the →eg_outgoing list 34 of the existence group 30. Block 60-9 releases the he_eh existence header's →eh_lock 24. Block 60-10 returns a success indication to the caller.

Figure 11:
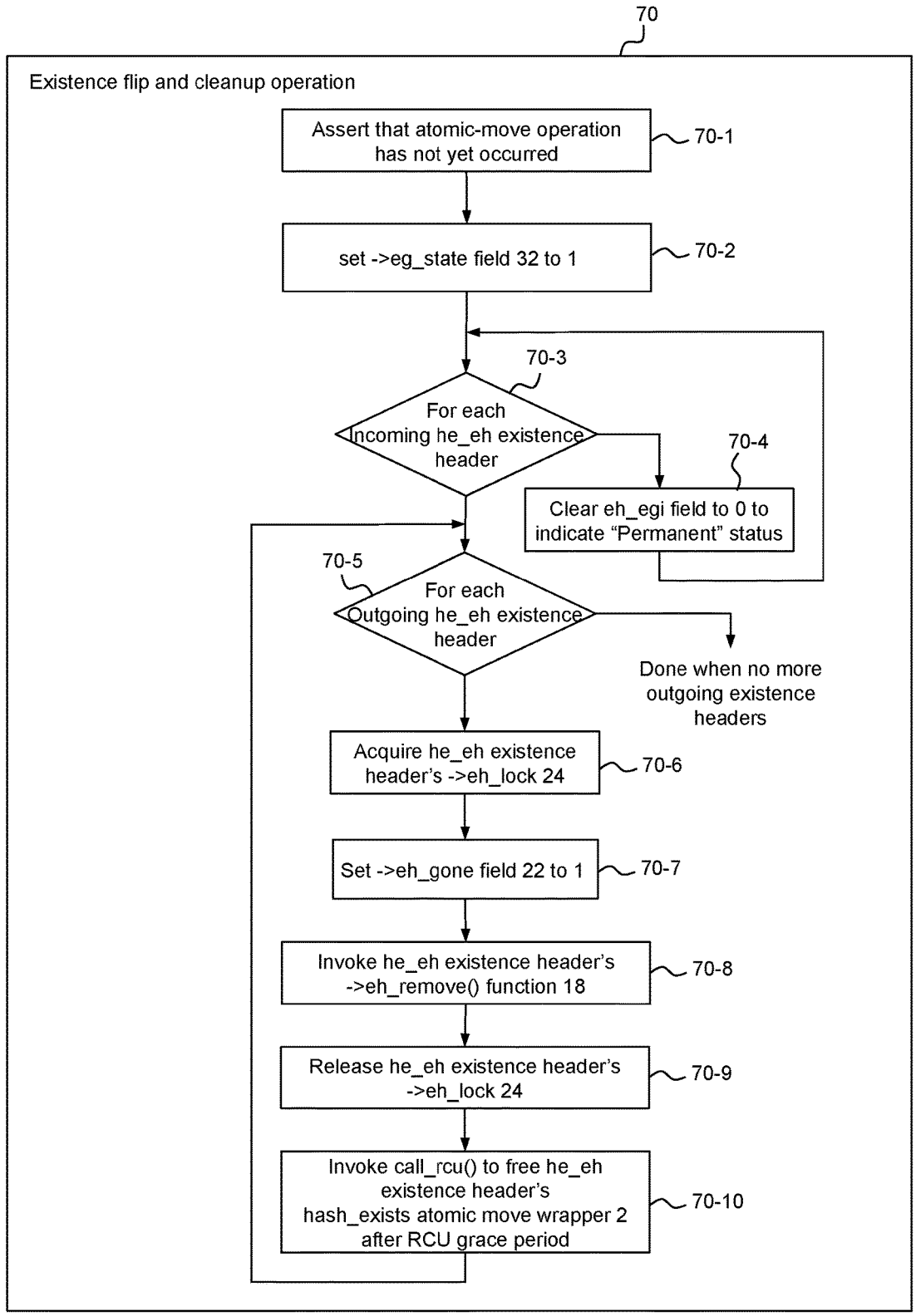
FIG. 11 is a flow diagram showing an example existence flip operation.

Turning now to FIG. 11, an example existence flip and cleanup operation 70 that may be performed by a hash table updater is shown. This operation is used when the updater needs to implement the actual atomic-move. The purpose of the existence flip portion of operation 70 is to effect the atomic-move. The purpose of the cleanup portion of operation 70 is to perform various housekeeping functions. For "Incoming" he_eh existence headers 6, the cleanup operation atomically updates their status from "Incoming" to "Permanent." For "Outgoing" he_eh existence headers 6, the clean up operation removes their associated data he_hte data element 4 from its RCU-protected linked data structure and causes the containing hash_exists atomic-move wrapper 2 to be freed after an RCU grace period elapses. The free operation necessarily frees the contents of the atomic-move wrapper 2, including the he_eh existence header 6 itself and the associated he_hte data element 4. Block 70-1 asserts that an atomic-move operation has not yet occurred. In an embodiment, this operation may be performed using a C-language command such as BUG_ON(ACCESS_ONCE ((egp→eg_state)), which performs a relaxed memory ordering load of the →eg_state field 32 of the existence group 30 and uses the Linux® BUG_ONO macro to verify the state. Block 70-2 sets the existence group's →eg_state field to 1, thereby effecting the atomic-move operation. An smp_store_release( ) function may be used for this operation to provide release memory ordering semantics. Block 70-3 iterates over each of the "Incoming" he_eh existence headers 4 in the existence group's →eg_incoming list 36 to implement block 70-4, which clears their →eh_egi field 12 to 0 to indicate "Permanent" status." Note that locking is not necessary because a concurrent updater attempting to remove any of these he_eh existence headers 6 will refuse to advance as long as the he_eh existence header's →eh_egi field 12 is non-zero (per blocks 60-4 and 60-5 of FIG. 10). Block 70-5 iterates over each of the "Outgoing" he_eh existence headers 4 in the existence group's →eg_outgoing list 34 to implement blocks 70-6 through 70-10. Block 70-6 acquires the he_eh existence header's →eh_lock 24. Block 70-7 sets the he_eh existence header's →eh_gone field 22 to 1 to mark this header gone. Block 70-8 invokes the he_eh existence header's eh_remove( ) function 18, if one exists, to remove the associated he_hte data element 4. Block 70-9 releases the he_eh existence header's →eh_lock 24 and block 70-10 frees the he_eh existence header's containing hash_exists wrapper 2 after an RCU grace period elapses. This call invokes the RCU call_rcu( ) primitive, passing as parameters the he_eh existence header's eh_rh field 26 and a callback function that invokes the eh_free( ) function referenced by the he_eh existence header's →eh_free( ) field 20. An example of the eh_free( ) function is discussed below in connection with FIG. 16.

Figure 12:
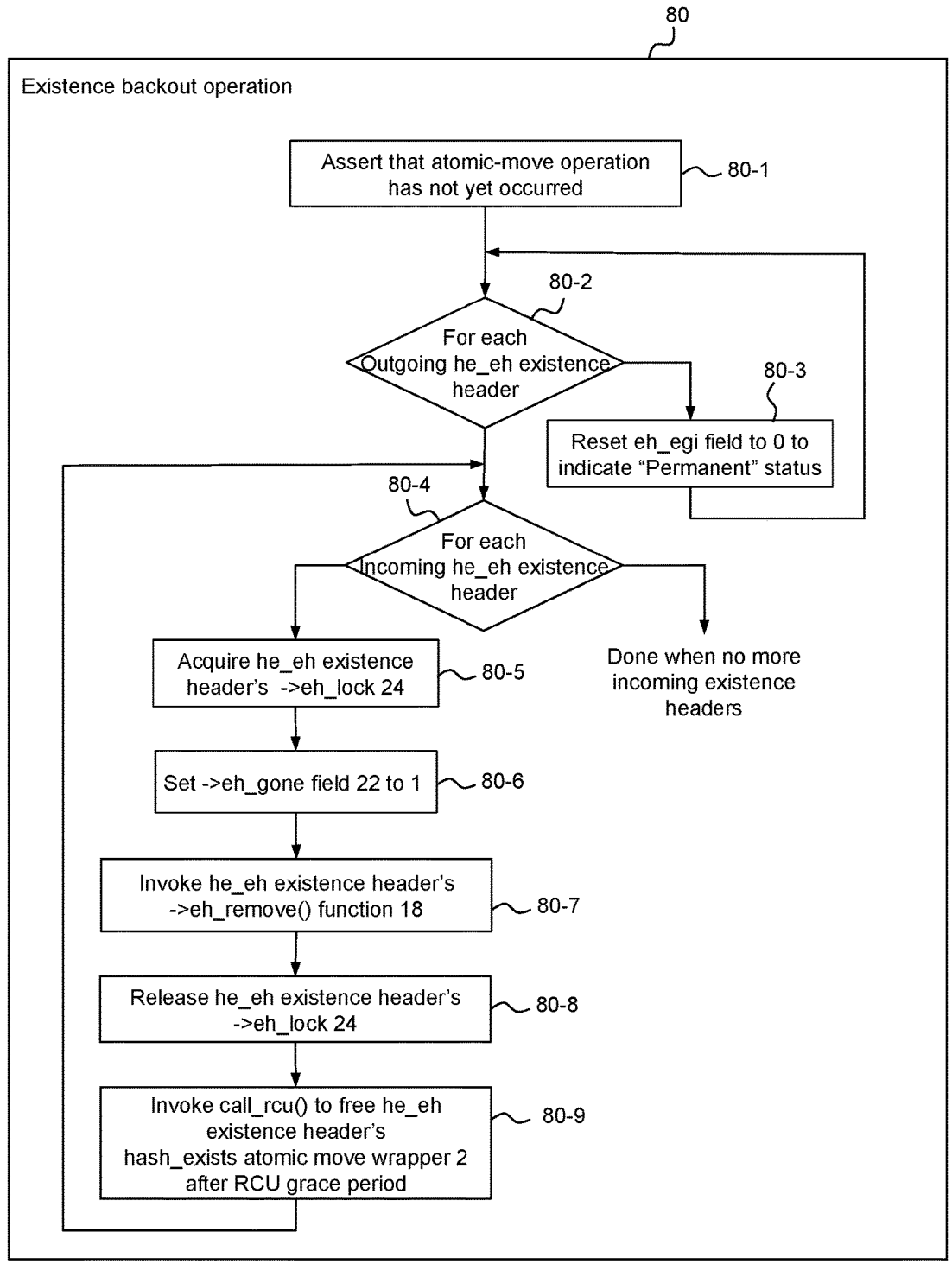
FIG. 12 is a flow diagram showing an example existence backout operation.

Turning now to FIG. 12, an example existence backout operation 80 that may be performed by a hash table updater is shown. This operation is used when the updater needs to backout of an unsuccessful atomic-move operation. More specifically, the existence backout operation 80 is performed prior to and in lieu of invoking the existence flip and cleanup operation 70, but following one or more invocations of the incoming existence header operation 50 (FIG. 9) and/or one or more invocations of the outgoing existence header operation 60 (FIG. 10). The purpose of the existence backout operation 80 is to perform various housekeeping functions that reverse the effects of the incoming existence header operation 50 and the outgoing existence header operation 60. For "Outgoing" he_eh existence headers 6, the cleanup operation atomically updates their status from "Outgoing" to "Permanent." For "Incoming" he_eh existence headers 6, the clean up operation removes their associated data he_hte data element 4 from its RCU-protected linked data structure and causes the containing hash_exists atomic-move wrapper 2 to be freed after an RCU grace period elapses. The free operation necessarily frees the contents of the atomic-move wrapper 2, including the he_eh existence header 6 itself and the associated he_hte data element 4. Block 80-1 asserts that an atomic-move operation has not yet occurred. In an embodiment, this operation may be performed using a C-language command such as BUG_ON(ACCESS_ONCE ((egp→eg_state)), which performs a relaxed memory ordering load of the →eg_state field 32 of the existence group 30 and uses the Linux® BUG_ON( ) macro to verify the state. Block 80-2 iterates over each of the "Outgoing" he_eh existence headers 4 to implement block 80-3, which resets their →eh_egi field 12 to 0 to indicate "Permanent" status." Block 80-4 iterates over each of the "Incoming" he_eh existence headers 4 to implement blocks 80-5 through 80-9.

Block 80-5 acquires the he_eh existence header's →eh_lock 24. Block 80-6 sets the he_eh existence header's →eh_gone field 22 to 1 to mark this header gone. Block 80-7 invokes the he_eh existence header's eh_remove( ) function 18, if one exists, to remove the associated he_hte data element 4. Block 80-8 releases the existence header's →eh_lock 24 and block 80-9 frees the he_eh existence header's containing hash_exists wrapper 2 after an RCU grace period elapses. This call invokes the RCU call_rcu( ) primitive, passing as parameters the he_eh existence header's eh_rh field 26 and a callback function that invokes the eh_free( ) function referenced by the he_eh existence header's →eh_free( ) field 20. An example of the eh_free( ) function is discussed below in connection with FIG. 16.

Figure 13:
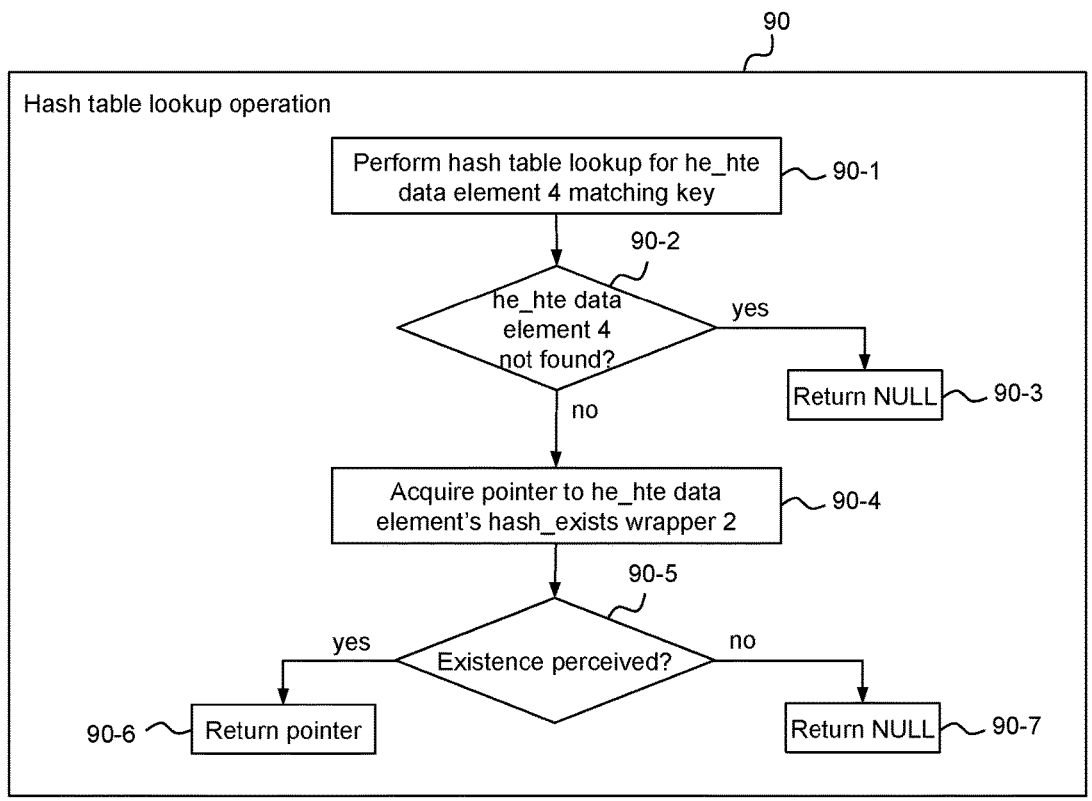
FIG. 13 is a flow diagram showing an example hash table lookup operation.
Figure 14:
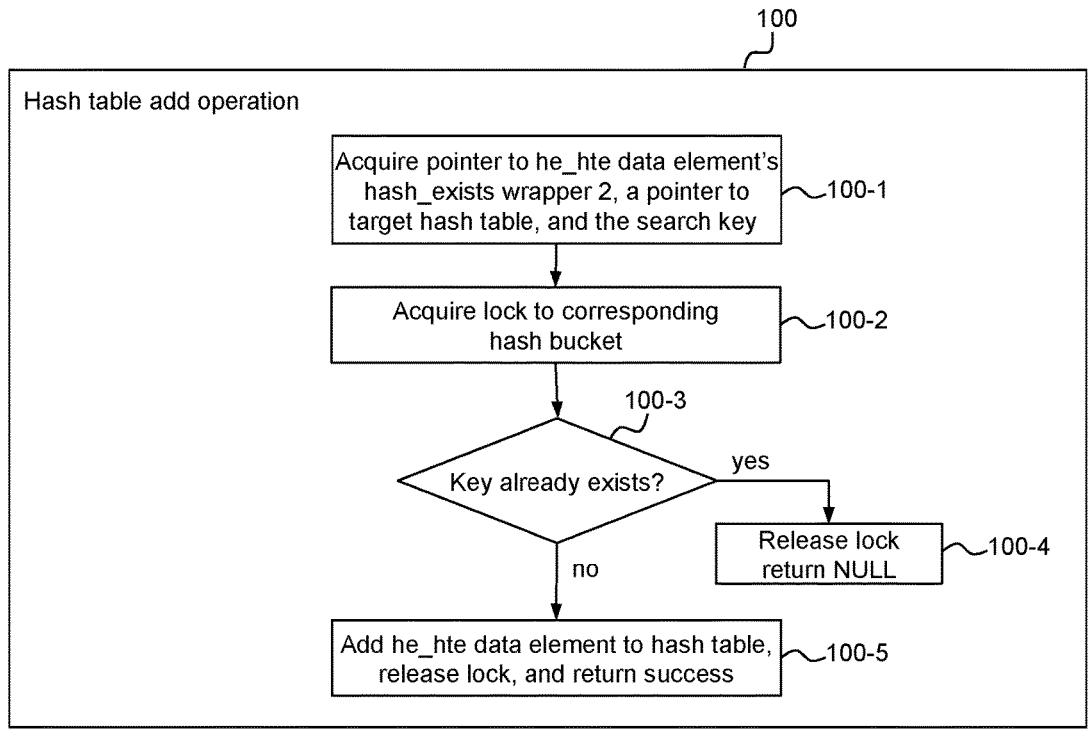
FIG. 14 is a flow diagram showing an example hash table add operation.
Figure 15:
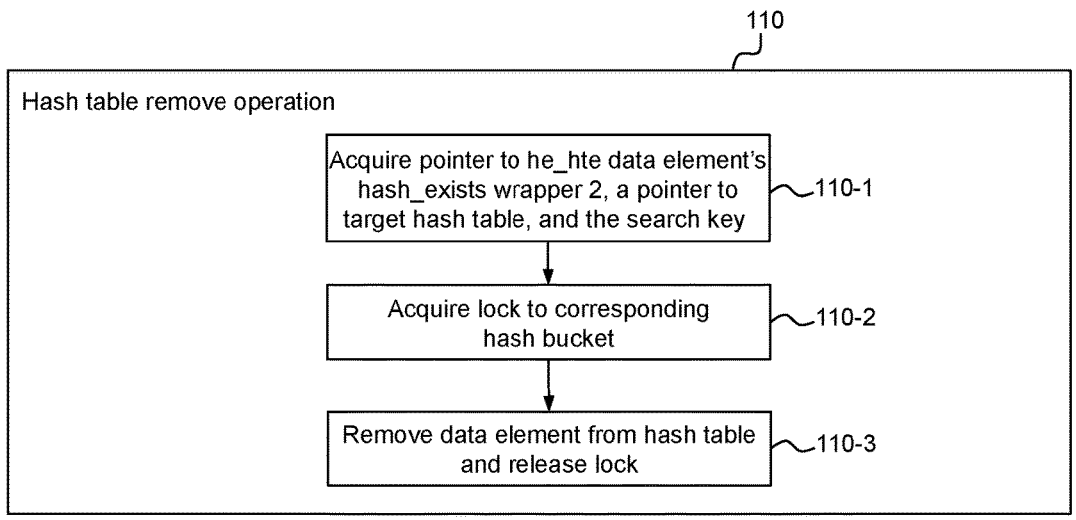
FIG. 15 is a flow diagram showing an example hash table remove operation.
Figure 16:
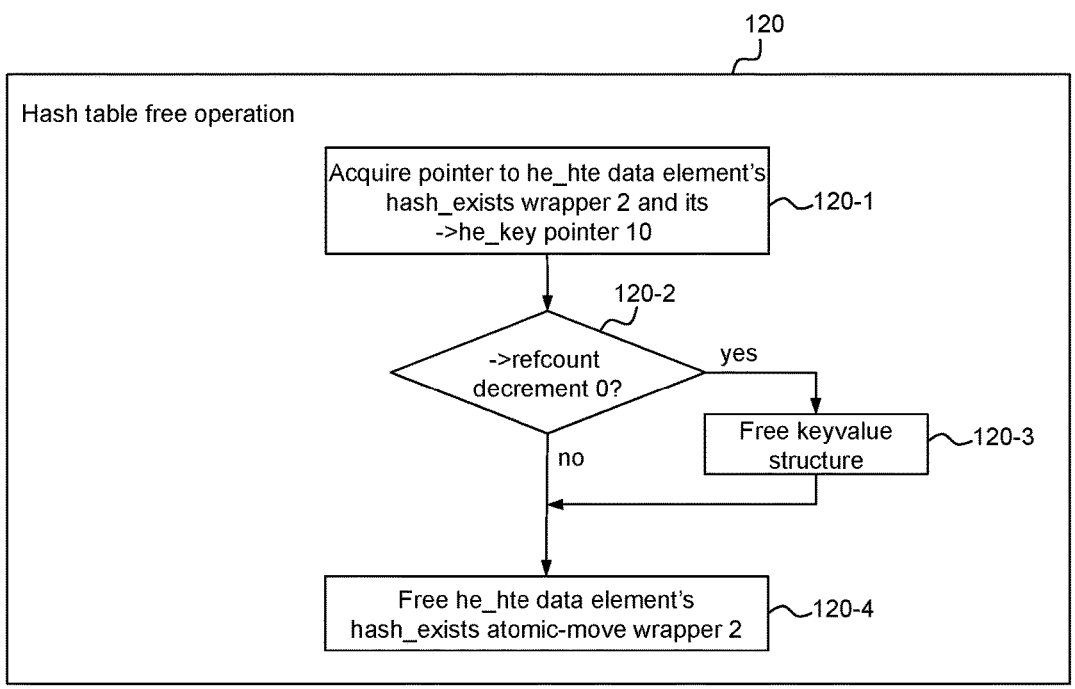
FIG. 16 is a flow diagram showing an example hash table free operation.
Figure 17:
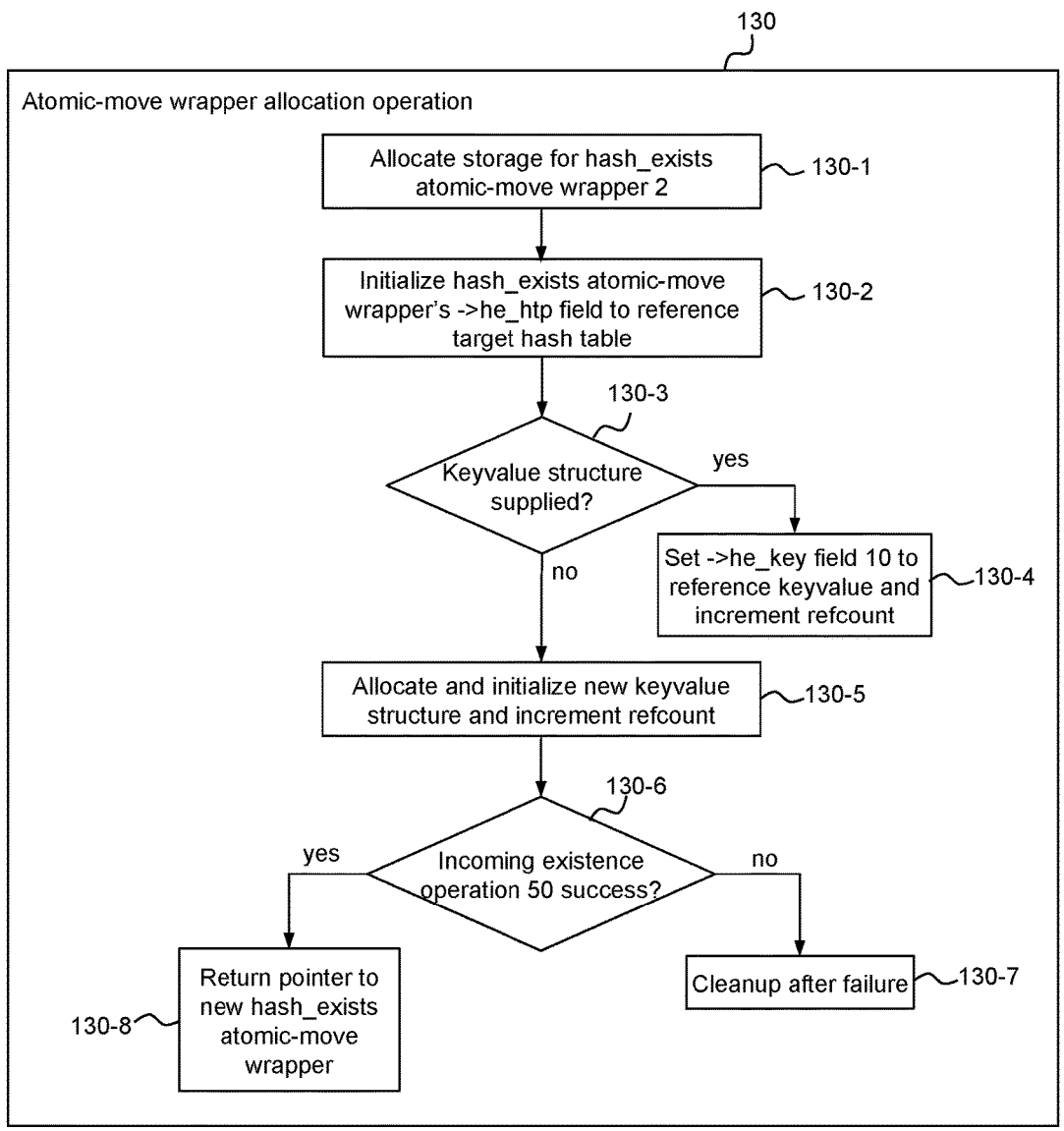
FIG. 17 is a flow diagram showing an example atomic-move wrapper allocation operation.

FIGS. 13-17 will now be described. In FIGS. 13, 14, 15 and 16 example lookup, addition, removal and free operations are respectively shown for an RCU-protected hash table in which updates are protected by per-bucket locks. In an embodiment, the addition, removal and free operations of FIGS. 14, 15 and 16 represent example functions that may be respectively referenced by the eh_add( ), eh_remove( ) and eh_free( ) fields 16, 18 and 20 of the he_eh existence headers 6. FIG. 17 additionally depicts a follow-on atomic-move wrapper allocation operation that allocates (if need be) and initializes an incoming keyvalue structure, then attempts to add it as incoming to the specified hash table.

Turning now to FIG. 13, an example hash table element lookup operation 90 that may be used by hash table readers is shown. Block 90-1 invokes a existing hash table lookup function to find an he_hte data element 4 that corresponds to a search key. Block 90-2 checks for lookup failure, and if true block 90-3 returns NULL. Otherwise, block 90-4 acquires a pointer to the he_hte data element's enclosing hash_exists atomic-move wrapper 2 and block 90-5 invokes the existence checking operation 40 of FIG. 8 to inspect he_eh existence header 6 associated with the the he_hte data element 4 to determine whether the latter should be perceived to exist. If so, block 90-6 returns the previously-acquired pointer to the he_hte data element 4. Otherwise, block 90-7 returns NULL.

Turning now to FIG. 14, an example hash table element add operation 100 that may be used by hash table updaters is shown. As previously noted, this operation may be used as the eh_add( ) function referenced in the →eh_add( ) field 16 of the eh_existence headers 6. Block 100-1 acquires a pointer to a new he_hte data element's hash_exists atomic-move wrapper 2, a pointer to the target hash table that will receive the data element, and the he_hte data element's associated key. Block 100-2 locks the corresponding hash-table bucket. Block 100-3 checks whether the key is already present in the hash table. If so, block 100-4 releases the hash bucket lock and returns an error indication. Otherwise, block 100-5 adds the he_hte data element 4 to the hash table, releases the hash bucket lock, and returns success.

Turning now to FIG. 15, an example hash table data element remove operation 110 that may be used by hash table updaters is shown. As previously noted, this operation may be used as the eh_remove( ) function referenced in the →eh_remove( ) field 18 of the eh_existence headers 6. Block 110-1 acquires a pointer to the he_hte data element's atomic-move wrapper 2, a pointer to the target hash table from which to remove the he_hte data element, and the data element's associated key. Block 110-2 locks the corresponding hash-table bucket. Block 110-3 removes the he_hte data element 4 from the hash table and releases the hash bucket lock. To protect concurrent RCU read-side operations, block 110-3 may use a function such as hashtab_del( ), which may call the cds_list_del_rcu( ) RCU primitive. The latter function removes the he_hte element 4 without disturbing RCU readers. Readers are further protected because the he_hte data element's he_eh existence header 6 will have already been set to "Outgoing" status by the outgoing existence header operation 60 by the time the hash table remove operation 110 is invoked from block 70-8 of the existence flip and cleanup operation 70. Thus, readers will not perceive the he_hte data element 4 to exist.

Turning now to FIG. 16, an example hash table data element free operation 120 that may be used by hash table updaters is shown. As previously noted, this operation may be used as the eh_free( ) function referenced in the →eh_free( ) field 20 of the eh_existence headers 6. Block 120-1 acquires a pointer to the he_hte data element's hash_exists atomic-move wrapper 2 and the wrapper's →he_key pointer 10 that references the he_hte data element's keyvalue structure. Block 120-2 decrements a reference counter associated with the keyvalue structure and tests for zero. If true, block 120-3 frees the keyvalue structure. Either way, block 120-4 frees the associated hash_exists wrapper 2 (including all contents thereof) after an RCU grace period has elapsed.

Turning now to FIG. 17, an example atomic-move wrapper allocation operation 130 that may be used by hash table updaters is shown. This operation is used to allocate, initialize, and insert a new hash_exists atomic-move wrapper 2. It can either make use of an existing keyvalue structure or allocate a new one based on values passed as arguments. Those skilled in the art will recognize the opportunity for further abstraction, for example, via use of C++ templates. Block 130-1 allocates the needed storage and may additionally provide for out-of-memory handling. Block 130-2 initializes the hash_exists atomic-move wrapper's →he_htp field 8 to reference the target hash table to which the wrapper's he_hte data element 4 is to be added. If line block 130-3 notes that a pre-existing keyvalue structure was supplied, block 130-4 causes the hash_exists atomic-move wrapper's →he_key field 10 to reference it. Block 130-4 also increments the keyvalue structure's reference count so as to allow a given keyvalue structure to be simultaneously present in a large number of hash tables, if desired. Otherwise, block 130-5 allocates and initializes a new keyvalue structure based on key and value arguments supplied to the operation 130, initializing the reference count to 1. Block 130-6 attempts to add the new hash_exists atomic-move wrapper 2 as incoming to the hash table by invoking the incoming existence header operation 50 of FIG. 9. If this attempt fails, block 130-7 cleans up after the failure, decrementing the keyvalue structure's reference count and unallocating this structure if appropriate, and unallocating the storage that was previously allocated in operation 130-1. Otherwise, block 130-8 returns a pointer to the new hash_exists atomic-move wrapper 2 to indicate success.

Figure 18:
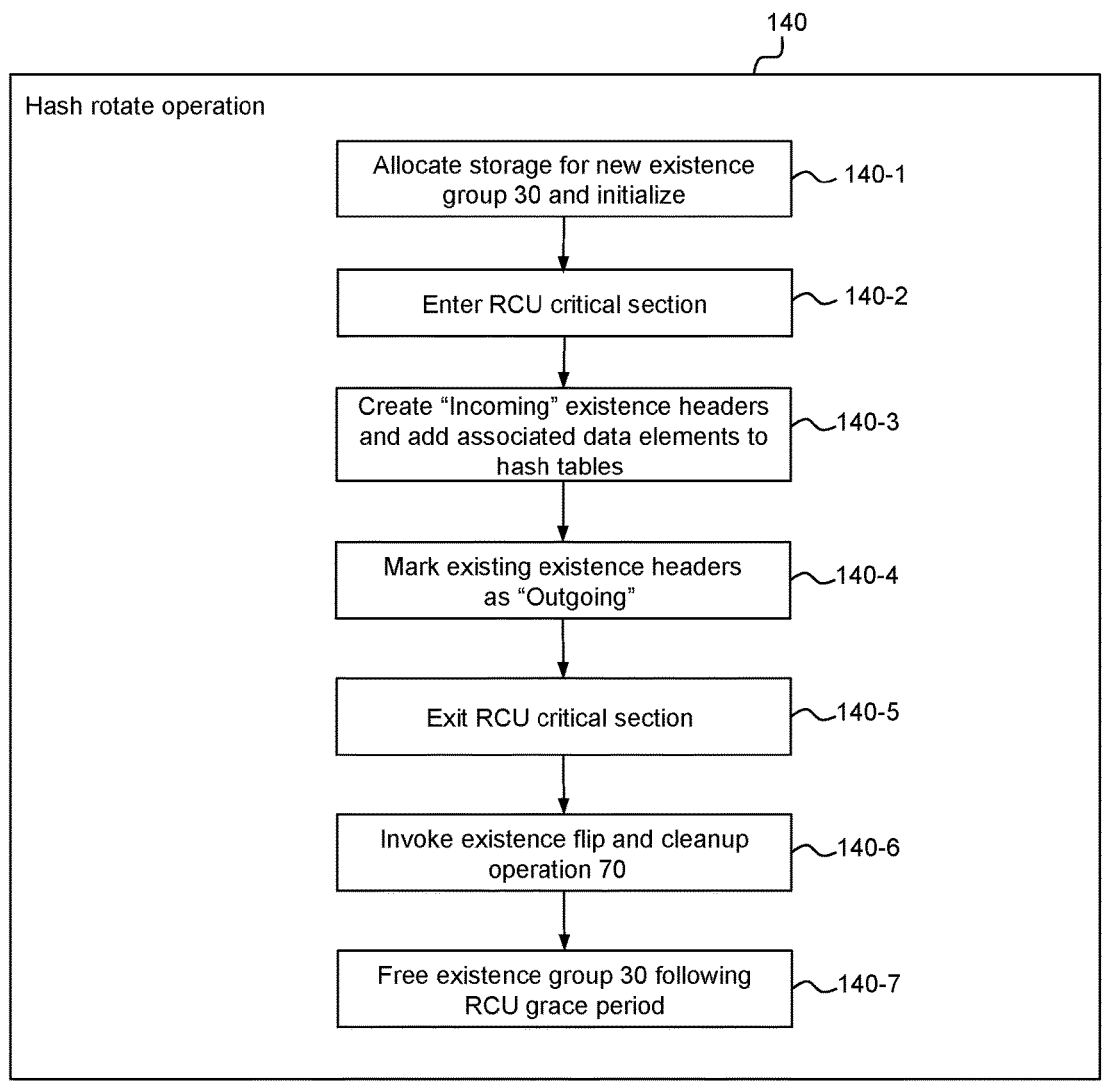
FIG. 18 is a flow diagram showing an example hash rotation operation.

Turning now to FIG. 18, a hash table rotation operation 140 is shown that may be used by hash table updaters to implement the hash table rotation example discussed in connection with FIGS. 1-4. Block 140-1 allocates storage for a new existence group 30 and initializes the existence group structure. Block 140-2 enters an RCU read-side critical section, as by calling the rcu_read_lock( ) primitive. Block 140-3 invokes the incoming existence header operation 50 of FIG. 9 to create the "Incoming" existence headers shown in FIG. 2, and add their associated data elements to the respective hash tables HT_0, HT_1 and HT_2. Block 140-4 invokes the outgoing existence header operation 60 of FIG. 10 to mark the "Permanent" existence headers shown in FIG. 1 as "Outgoing" existence headers, as shown in FIG. 2. In an embodiment, blocks 140-3 and 140-4 may test the return values of their respective operations and use the existence backout operation 80 of FIG. 12 to recover from any failure. Block 140-5 exits the RCU read-side critical section that was entered in block 140-2, as by calling the rcu_read_unlock( ) primitive. Block 140-6 implements the existence flip and cleanup operation 70 of FIG. 11 to carry out the atomic-move rotation. Block 140-7 causes the existence group 30 to be freed following an RCU grace period, as by invoking the call_rcu( ) primitive. This call uses the existence group's →eg_rh field 38 to place this structure on an RCU callback list in order to be freed after an RCU grace period elapses.

In an embodiment, an optimization could provide a queue between a task that mostly frees memory and a related task that mostly allocates it. In that case, the freeing task could be a userspace-RCU call_rcu( ) task, and the allocating task could be a worker task setting up for atomic-move operations. Setting up such a queue may improve atomic-update performance and scalability. One approach would be to use a userspace-RCU create_call_rcu_data( ) function to associate a separate call_rcu( ) task with each atomic-move worker task (which can also improve performance and scalability of update-heavy workloads). Then the call_rcu( ) function may be used to associate the freeing end of the queue with the call_rcu( ) task.

Figure 19:
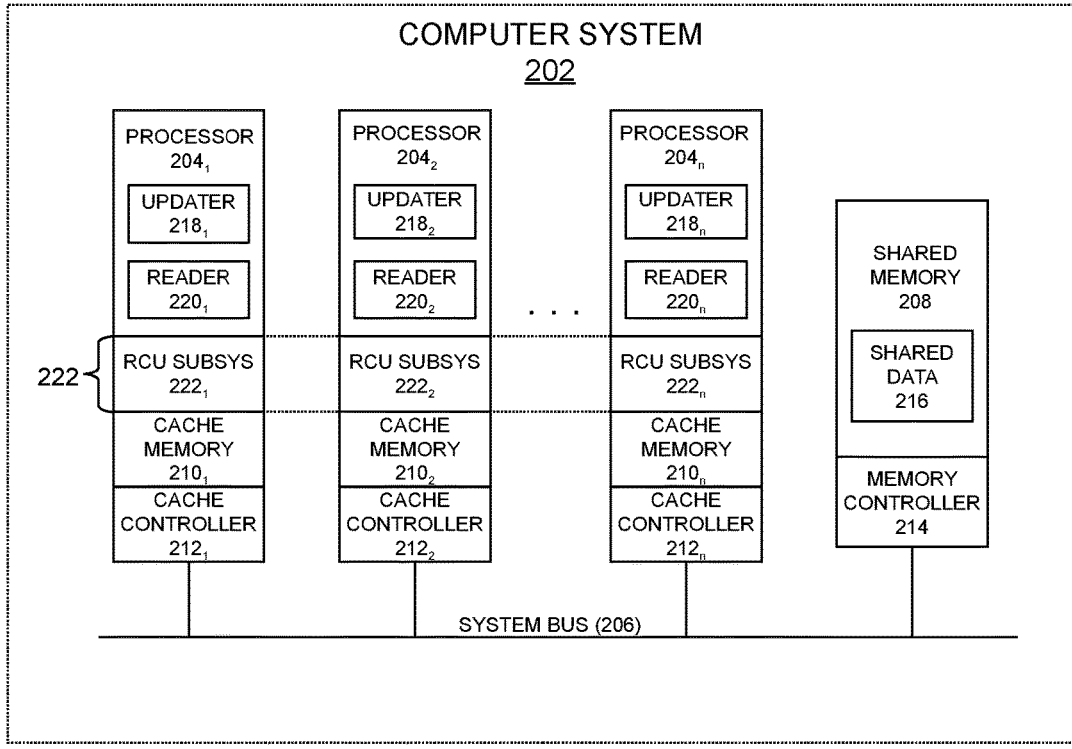
FIG. 19 is a functional block diagram showing an example computer system.

Turning now to the FIG. 19, an example computing environment is illustrated in which atomic-move operations as described above may be implemented in order to improve computer operation. In particular, an example computer system 202 is shown in which one or more processors $204_1$, $204_2$ . . . $204_n$ are operatively connected by way of a common bus 206 (or other interconnection pathway) to a shared memory 208. Respectively associated with each processor $204_1$, $204_2$ . . . $204_n$ is a cache memory $210_1$, $210_2$ . . . $210_n$ and a cache controller $212_1$, $212_2$ . . . $212_n$. A memory controller 214 is associated with the shared memory 208. It stores shared data that is accessed by data processing operations that variously run on the processors $204_1$, $204_2$ . . . $204_n$. This data may include linked data structures (such as hash tables) and data elements thereof that are to be atomically moved.

The computer system 202 may represent any of several different types of computing apparatus. Examples include, but are not limited to, general purpose computers, special purpose computers, portable computing devices, communication and/or media player devices, set-top devices, embedded systems, and other types of information handling machines. The term "processor" as used with reference to the processors $204_1$, $204_2$ . . . $204_n$ encompasses any logical execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). The processors $204_1$, $204_2$ . . . $204_n$ may be situated within a single computing device or node (e.g., as part of a single-node SMP system) or they may be distributed over plural nodes (e.g., as part of a NUMA system, a cluster, or a cloud). The memory 208 may comprise any type of non-transitory data storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $210_1$, $210_2$ . . . $210_n$ may be implemented in several levels (e.g., as level 1, level 2 and level 3 caches) and the cache controllers $212_1$, $212_2$ . . . $212_n$ may collectively represent the cache controller logic that supports each cache level. The memory controller 214 may reside separately from processors $204_1$, $204_2$ . . . $204_n$, for example, as part of a discrete chipset. Alternatively, the memory controller 214 could be provided by plural memory controller instances that are respectively integrated with the processors $204_1$, $204_2$ . . . $204_n$.

Each of the processors $204_1$, $204_2$ . . . $204_n$ is operable to execute program instruction logic under the control of program instructions stored in the memory 208 (or elsewhere). As part of this program execution logic, update operations (updaters) 218 will periodically execute within a process, thread, or other execution context (hereinafter "task") on the processors $204_1$, $204_2$ . . . $204_n$ to perform atomic-move operations involving the shared data 416, as disclosed herein. Reference numerals $218_1$, $218_2$ . . . $218_n$ illustrate individual updaters that may execute from time to time on the various processors $204_1$, $204_2$ . . . $204_n$. Each of the processors $204_1$, $204_2$ . . . $204_n$ also periodically executes read operations (readers) 220 with respect to the shared data 216. Reference numerals $220_1$, $220_2$ . . . $220_n$ illustrate individual readers that may execute from time to time on the various processors $204_1$, $204_2$ . . . $204_n$.

Figure 20:
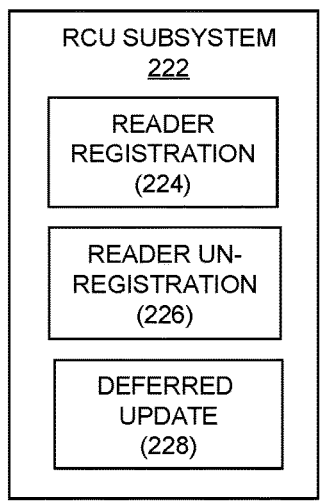
FIG. 20 is a functional block diagram showing example components of an RCU subsystem of the computer system of FIG. 19.

To facilitate synchronized updater-reader access to the shared data 216, the several processors $204_1$, $204_2$ . . . $204_n$ may be programmed to implement an RCU subsystem 222 by periodically executing respective RCU instances $222_1$, $222_2$ . . . $222_n$ as part of their operating system functions or user-mode operations. As shown in FIG. 20, each of the read-copy update subsystem instances 222 may include a reader registration component 224, a reader un-registration component 226, and a deferred update component 228. The reader registration component 224 may be used by the readers 220 (and by the updaters 218) when they enter an RCU-protected critical section, such as the start of a search for a data element in a linked data structure. This component may be implemented using an RCU primitive such as rcu_read_lock( ). The reader un-registration component 226 may be used by the readers 220 (and by the updaters 218) when they leave an RCU-protected critical section, such as at the end of a search for a data element in a linked data structure. This component may be implemented using an RCU primitive such as rcu_read_unlock( ). The deferred update component 226 is used by the updaters 218 to initiate deferred operations following a grace period in each of the processors $204_1$, $204_2$ . . . $204_n$ will have passed through a quiescent state. The deferred update component 228 may be implemented using conventional RCU processing techniques. For example, it may be provided by a primitive such as call_rcu( ) or synchronize_rcu( ), the former utilizing asynchronous grace period detection and the latter utilizing synchronous grace period detection. As noted above, other deferred deallocation techniques providing other semantics may also be used.

Accordingly, a technique for atomically moving data elements between or within linked data structures having no support for atomic moves has been disclosed. It will be appreciated that the foregoing concepts may be variously embodied in any of a data processing system, a machine implemented method, and a computer program product in which programming logic is provided by one or more computer-readable storage media for use in controlling a computing system to perform the required functions.

Example embodiments of a machine-implemented method were previously described in connection with FIGS. 1-18. Example embodiments of a data processing system were previously described in connection with FIGS. 19 and 20.

With respect to a computer program product, digitally encoded program instructions may be stored on one or more non-transitory computer-readable data storage media for use in controlling a computer or other information handling machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 21:
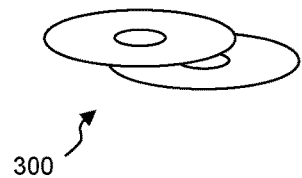
FIG. 21 is a diagrammatic representation of example non-transitory computer-readable data storage media.

Example data storage media for storing such program instructions are shown by reference numerals 408 (memory) and 410 (cache) of the computer system 402 of FIG. 14. The computer system 402 may further include one or more secondary (or tertiary) storage devices (not shown) that could store the program instructions between system reboots. The computer system 402 could also store information on one or more remote servers (not shown), which would also include a computer readable storage medium for storing program instructions as described herein. A further example of a computer readable storage medium that may be used to store the program instructions would be portable optical storage disks of the type that are conventionally used for commercial software sales, such as compact disk-read only memory (CD-ROM) disks, compact disk-read/write (CD-R/W) disks, and digital versatile disks (DVDs). Examples of such media are shown by reference number 300 in FIG. 21.

The computer readable storage medium can thus be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program code described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program code from the network and forwards the computer readable program code for storage in a computer readable storage medium within the respective computing/processing device.

Computer readable program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). As previously mentioned, in some embodiments, electronic circuitry including, for example, programmable logic circuitry, field-programmable gate arrays (FPGA), or programmable logic arrays (PLA) may execute the computer readable program code by utilizing state information of the computer readable program code to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program code.

The computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program code may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program code may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that any invention disclosed herein is not to be in any way limited except in accordance with the spirit of the appended claims and their equivalents.

What is claimed is:

1. A method for atomically moving a data element between or within linked data structures protected by read-copy update (RCU) and having no support for atomic moves, comprising:

providing an atomic-move wrapper around the data element;

the atomic-move wrapper including an existence header having a status field that indicates whether the existence header is a permanent existence header for a data element that is a member of an RCU-protected linked data structure and is not undergoing an atomic-move operation, whether the existence header is an outgoing existence header for a data element that is to undergo an atomic-move operation which removes the data element from an RCU-protected linked data structure, or whether the existence header is an incoming existence header for a data element that is to undergo an atomic-move operation which adds the data element to an RCU-protected linked data structure;

the existence header maintaining a reference to an existence group having an existence group state field that can be switched between a first state and a second state;

the first state indicating that the data element is deemed to exist if it has an outgoing existence header and to not exist if it has an incoming existence header;

the second state indicating that the data element is deemed to exist if it has an incoming existence header and to not exist if it has an outgoing existence header;

if the data element is to be added to an RCU-protected linked data structure, designating its existence header as incoming and adding the data element to the RCU-protected linked data structure;

if the data element is to be is to be removed from an RCU-protected linked data structure, designating its existence header as outgoing;

changing the state of the existence group state field from the first state to the second state using a single store operation to indicate existence for the data element if it has an incoming existence header and non-existence for the data element if it has an outgoing existence header;

if the data element has an incoming existence header, updating the existence header's status field to indicate that the existence header is a permanent existence header;

if the data element has an outgoing existence header, removing the data element from an RCU-protected linked data structure; and causing the existence group to be freed following an RCU grace period, as well as the atomic-move wrapper and its contents if the atomic-move wrapper contains a removed data element having an outgoing existence header.

2. The method of claim 1, wherein there are plural data elements that are members of one or more RCU-protected linked data structures, each data element having an atomic wrapper and an existence header, and wherein changing the state of the existence group state field causes a first set of the data elements having incoming existence headers to be deemed to exist and a second set of the data elements having outgoing existence headers to be deemed to not exist.

3. The method of claim 2, wherein the existence group maintains a first list of outgoing existence headers and a second list of incoming existence headers.

4. The method of claim 3, wherein after changing the state of the existence group state field, a cleanup operation is performed, the cleanup operation including iterating on the first list of outgoing existence headers, and for each outgoing existence header, marking the existence header as gone, removing the associated data element from an RCU-protected linked data structure, and causing the containing atomic-move wrapper and its contents to be freed following an RCU grace period, and wherein iterating on the second list of incoming existence headers includes, for each incoming existence header, updating the existence header's status field to indicate that the existence header is a permanent existence header.

5. The method of claim 3, wherein prior to and in lieu of changing the state of the existence group state field, a backout operation is performed, the backout operation including iterating on the first list of outgoing existence headers, and for each outgoing existence header, updating the existence header status field to indicate that the existence header is a permanent existence header, and iterating on the second list of incoming existence headers, and for each incoming existence header, marking the existence header as gone, removing the associated data element from an RCU-protected linked data structure, and causing the containing atomic-move wrapper and its contents to be freed following an RCU grace period.

6. The method of claim 1, wherein the existence headers maintain references to functions that respectively add, remove and free the data element.

7. The method of claim 1, wherein the method includes utilizes producer-consumer memory allocation to handle high-intensity update traffic due high volumes of concurrent atomic-move operations, the producer-consumer memory allocation providing a queue between a task that mostly frees memory and a related task that mostly allocates it, the task that mostly frees memory being an RCU task that frees the outgoing existence header and the existence group following an RCU grace period, and the task that mostly allocates memory being an atomic-move worker task that sets up the atomic-move wrapper and data element for atomic-move operations.

8. A system, comprising:
one or more processors;
a memory coupled to the one or more processors, the memory including a computer usable medium storing at least one program of instructions executable by the processor to perform operations for atomically moving a data element between or within linked data structures protected by read-copy update (RCU) and having no support for atomic moves, the operations comprising:
providing an atomic-move wrapper around the data element;
the atomic-move wrapper including an existence header having a status field that indicates whether the existence header is a permanent existence header for a data element that is a member of an RCU-protected linked data structure and is not undergoing an atomic-move operation, whether the existence header is an outgoing existence header for a data element that is to undergo an atomic-move operation which removes the data element from an RCU-protected linked data structure, or whether the existence header is an incoming existence header for a data element that is to undergo an atomic-move operation which adds the data element to an RCU-protected linked data structure;
the existence header maintaining a reference to an existence group having an existence group state field that can be switched between a first state and a second state;
the first state indicating that the data element is deemed to exist if it has an outgoing existence header and to not exist if it has an incoming existence header;
the second state indicating that the data element is deemed to exist if it has an incoming existence header and to not exist if it has an outgoing existence header;
if the data element is to be added to an RCU-protected linked data structure, designating its existence header as incoming and adding the data element to the RCU-protected linked data structure;
if the data element is to be is to be removed from an RCU-protected linked data structure, designating its existence header as outgoing;
changing the state of the existence group state field from the first state to the second state using a single store operation to indicate existence for the data element if it has an incoming existence header and non-existence for the data element if it has an outgoing existence header;
if the data element has an incoming existence header, updating the existence header's status field to indicate that the existence header is a permanent existence header;
if the data element has an outgoing existence header, removing the data element from an RCU-protected linked data structure; and
causing the existence group to be freed following an RCU grace period, as well as the atomic-move wrapper and its contents if the atomic-move wrapper contains a removed data element having an outgoing existence header.

9. The system of claim 8, wherein there are plural data elements that are members of one or more RCU-protected linked data structures, each data element having an atomic wrapper and an existence header, and wherein changing the state of the existence group state field causes a first set of the data elements having incoming existence headers to be deemed to exist and a second set of the data elements having outgoing existence headers to be deemed to not exist.

10. The system of claim 9, wherein the existence group maintains a first list of outgoing existence headers and a second list of incoming existence headers.

11. The system of claim 10, wherein after changing the state of the existence group state field, a cleanup operation is performed, the cleanup operation including iterating on the first list of outgoing existence headers, and for each outgoing existence header, marking the existence header as gone, removing the associated data element from an RCU-protected linked data structure, and causing the containing atomic-move wrapper and its contents to be freed following an RCU grace period, and wherein iterating on the second list of incoming existence headers includes, for each incoming existence header, updating the existence header's status field to indicate that the existence header is a permanent existence header.

12. The system of claim 10, wherein prior to and in lieu of changing the state of the existence group state field, a backout operation is performed, the backout operation including iterating on the first list of outgoing existence headers, and for each outgoing existence header, updating the existence header status field to indicate that the existence header is a permanent existence header, and iterating on the second list of incoming existence headers, and for each incoming existence header, marking the existence header as gone, removing the associated data element from an RCU-protected linked data structure, and causing the containing atomic-move wrapper and its contents to be freed following an RCU grace period.

13. The system of claim 12, wherein the existence headers maintain references to functions that respectively add, remove and free the data element.

14. The system of claim 8, wherein the operations include utilizing producer-consumer memory allocation to handle high-intensity update traffic due high volumes of concurrent atomic-move operations, the producer-consumer memory allocation including providing a queue between a task that mostly frees memory and a related task that mostly allocates it, the task that mostly frees memory being an RCU task that frees the outgoing existence header and the existence group following an RCU grace period, and the task that mostly allocates memory being an atomic-move worker task that sets up the atomic-move wrapper and data element for atomic-move operations.

15. A computer program product, comprising:
one or more non-transitory computer-readable data storage media;
program instructions stored on the one or more data storage media for programming a data processing platform having one or more processors operatively coupled to a memory to perform operations for atomically moving a data element between or within linked data structures protected by read-copy update (RCU) and having no support for atomic moves, the operations comprising:
providing an atomic-move wrapper around the data element;
the atomic-move wrapper including an existence header having a status field that indicates whether the existence header is a permanent existence header for a data element that is a member of an RCU-protected linked data structure and is not undergoing an atomic-move operation, whether the existence header is an outgoing existence header for a data element that is to undergo an atomic-move operation which removes the data element from an RCU-protected linked data structure, or whether the existence header is an incoming existence header for a data element that is to undergo an atomic-move operation which adds the data element to an RCU-protected linked data structure;

the existence header maintaining a reference to an existence group having an existence group state field that can be switched between a first state and a second state;

the first state indicating that the data element is deemed to exist if it has an outgoing existence header and to not exist if it has an incoming existence header;

the second state indicating that the data element is deemed to exist if it has an incoming existence header and to not exist if it has an outgoing existence header;

if the data element is to be added to an RCU-protected linked data structure, designating its existence header as incoming and adding the data element to the RCU-protected linked data structure;

if the data element is to be is to be removed from an RCU-protected linked data structure, designating its existence header as outgoing;

changing the state of the existence group state field from the first state to the second state using a single store operation to indicate existence for the data element if it has an incoming existence header and non-existence for the data element if it has an outgoing existence header;

if the data element has an incoming existence header, updating the existence header's status field to indicate that the existence header is a permanent existence header;

if the data element has an outgoing existence header, removing the data element from an RCU-protected linked data structure; and causing the existence group to be freed following an RCU grace period, as well as the atomic-move wrapper and its contents if the atomic-move wrapper contains a removed data element having an outgoing existence header.

16. The computer program product of claim 15, wherein there are plural data elements that are members of one or more RCU-protected linked data structures, each data element having an atomic wrapper and an existence header, and wherein changing the state of the existence group state field causes a first set of the data elements having incoming existence headers to be deemed to exist and a second set of the data elements having outgoing existence headers to be deemed to not exist.

17. The computer program product of claim 16, wherein the existence group maintains a first list of outgoing existence headers and a second list of incoming existence headers.

18. The computer program product of claim 17, wherein after changing the state of the existence group state field, a cleanup operation is performed, the cleanup operation including iterating on the first list of outgoing existence headers, and for each outgoing existence header, marking the existence header as gone, removing the associated data element from an RCU-protected linked data structure, and causing the containing atomic-move wrapper and its contents to be freed following an RCU grace period, and wherein iterating on the second list of incoming existence headers includes, for each incoming existence header, updating the existence header's status field to indicate that the existence header is a permanent existence header.

19. The computer program product of claim 17, wherein prior to and in lieu of changing the state of the existence group state field, a backout operation is performed, the backout operation including iterating on the first list of outgoing existence headers, and for each outgoing existence header, updating the existence header status field to indicate that the existence header is a permanent existence header, and iterating on the second list of incoming existence headers, and for each incoming existence header, marking the existence header as gone, removing the associated data element from an RCU-protected linked data structure, and causing the containing atomic-move wrapper and its contents to be freed following an RCU grace period.

20. The computer program product of claim 15, wherein the operations include utilizing producer-consumer memory allocation to handle high-intensity update traffic due high volumes of concurrent atomic-move operations, the producer-consumer memory allocation including providing a queue between a task that mostly frees memory and a related task that mostly allocates it, the task that mostly frees memory being an RCU task that frees the outgoing existence header and the existence group following an RCU grace period, and the task that mostly allocates memory being an atomic-move worker task that sets up the atomic-move wrapper and data element for atomic-move operations.

* * * * *